Patented Sept. 21, 1937

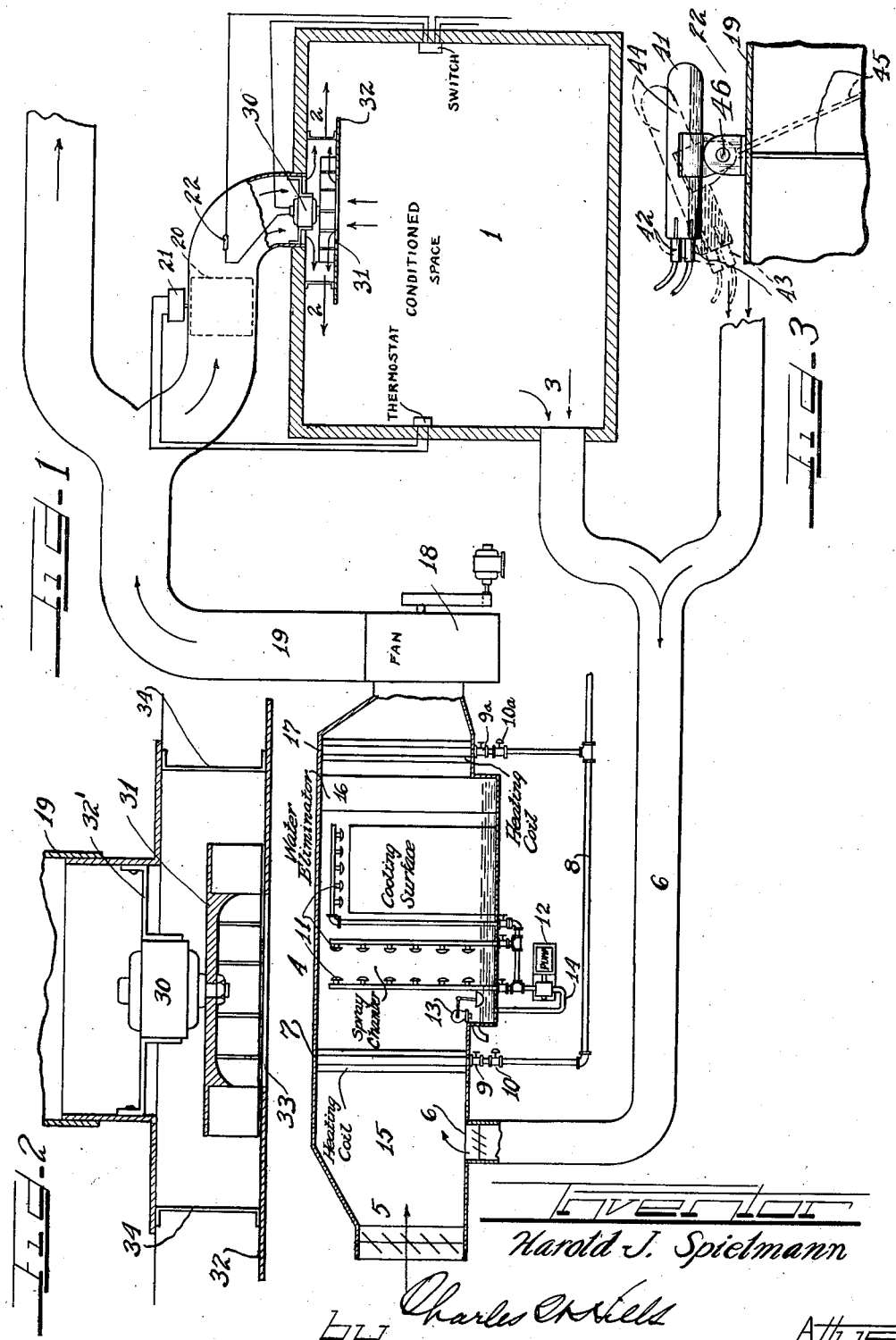

2,093,936

UNITED STATES PATENT OFFICE 2,093,936

AIR CONDITIONING DEVICE

Harold J. Spielmann, Park Ridge, Ill., assignor to Monad Corporation, Chicago, Ill., a corporation of Illinois Application February 12, 1931, Serial No. 515,386

4 Claims. (Cl. 98—33)

This invention relates to air conditioning apparatus and ventilating systems operating on the principle invoked by said apparatus. More particularly this invention relates to an apparatus for obtaining a predetermined humidity and temperature condition in a space by introducing into that space, air which has been treated and brought down to a predetermined dew point temperature. In the usual cooling and dehumidifying application of my invention, treated air is introduced into the said space without reheating by means of a mechanical diffuser. For special conditions sensible heat may be added after the air has been treated.

In general, there are two systems of producing predetermined temperature and humidity conditions in a space:

1. Air to be introduced into the conditioned space is reduced to a dew point temperature based on the conditioned space requirements. The volume of such air to exactly compensate for room heat gains cannot successfully be introduced directly into the space because the great differential between the dew point temperature and the space temperature results in drafts and uneven air conditions. Therefore, a greater volume of air than is necessary to compensate for the conditioned space heat gains must be reduced to a dew point temperature based on the conditioned space requirements and reheated with steam coils or other heating mechanisms to reduce the differential between the delivered air temperature and the space temperature. By reducing the aforementioned differential the conditioned air may be successfully introduced into the conditioned space without objectionable drafts and uneven space air conditions. The reheating incurs a loss in refrigeration and the circulation of an increased volume of air.

2. A predetermined part of the air circulated is allowed to pass through a conditioning apparatus and is there reduced to a predetermined dew point temperature such that the required amount of dry heat and latent heat is abstracted to exactly compensate for the dry and latent heat gains in the conditioned space. This air, after being treated is then mixed with air taken from the conditioned space, thereby effecting a raising of the temperature of the treated air, which may be so regulated as to directly introduce the mixture into the conditioned space without discomfort. The mixture will have exactly the same conditioning value as the partial volume of air which has been passed through the de-humidifier and treated. This method saves refrigeration tonnage but requires the same volume of air to be circulated as in the first process. This is the general method disclosed in Fleisher Patents Nos. 1,670,656, 1,751,805, 1,751,806 and Lissauer and Keyes Patent No. 1,416,218.

My invention, on the other hand, comprises the treatment of air by cooling and dehumidifying to a predetermined dew point temperature the exact volume necessary to compensate for the dry and latent heat gains in the room through a cooling and dehumidifier unit and diffusing said conditioned air into the room so as to prevent drafts and uneven temperature conditions in the room. In accord with my invention, undiluted conditioned air is introduced into the room without reheating in a manner so as not to cause any discomfort to the individuals occupying the room. This is accomplished by means of my diffuser mechanism located at the outlet of the feeder duct and preferably suspended from the ceiling of the room. Undiluted and un-reheated conditioned air from the de-humidifier unit is diffused with air in the room and forcibly ejected laterally along the ceiling of the room gradually diffusing downwardly thereby maintaining uniform temperature and humidity conditions throughout the room.

My invention not only allows the saving of refrigeration capacity as outlined in Process 2 above, but also allows the circulation of a much smaller volume of air through the long ducts in the ventilating system with an advantage of saving the power cost in propelling air through these ducts. The installation cost effected by utilization of smaller ducts for reduced air volume is materially reduced and space required throughout the building for the circulating conduits is also reduced.

The space that can be served by one of my diffuser units is materially greater than the space that can be treated by an ordinary conditioned air outlet, due to the positive action of my diffuser unit in forcibly ejecting the diffused conditioned air laterally along the ceiling. I therefore am able to materially reduce the number of conditioned air supply points required by heretofore known methods for a given room space at a considerable saving.

My preferred system also permits an individual control of the circulation of treated air in each zone within the space to be conditioned and may be installed so as to be entirely automatic in its operation.

It is therefore an object of this invention to provide a process for the automatic control of temperature and humidity conditions in a given space in several different ways.

It is also an object of this invention to afford individual circulating and regulating means for every room or space receiving conditioned air from a centrally located unit.

An important object of my invention is to introduce cooled and de-humidified air without reheating into a room so as not to cause drafts or uneven temperature conditions.

Another object of my invention is to greatly reduce installation costs of a given unit.

Another important object of this invention is to reduce the size of air circulating ducts in an air conditioning system to a minimum.

Another important object is to materially reduce the building space requirements for a given unit by reduction in size of conduit requirements.

Another important object of this invention is to devise a diffusing means whereby treated air from a centrally located conditioning plant or unit may be introduced and diffused through individual rooms or spaces to be conditioned according to the need or taste of individuals in each room.

The invention, accordingly, comprises an air conditioning device and system possessing the features and properties and relation of elements which will be more fully hereinafter set forth.

Other and further important objects of this invention will be apparent from the disclosures in the specification and the accompanying drawing.

This invention (in a preferred form) is illustrated in the drawing and hereinafter more fully described.

On the drawing:

Figure 1 is a diagrammatic view of an embodiment of the invention showing the installation of the specific diffusing means to be used in each conditioned space together with an ordinary type of air conditioning and treating chamber connected to the conditioned space by means of air ducts. Only one conditioned space is shown in this figure, but it is evident that other spaces are to be included in the complete system as is shown by the branched feed and return ducts disclosed in the diagram.

Figure 2 is a diagrammatic view of a cross section of the diffusing mechanism enlarged so as to more clearly emphasize its operative features.

Figure 3 is a diagrammatic view of a mercoid switch which may be used to automatically control the operation of the diffusing apparatus.

As shown on the drawing:

In Figure 1, the numeral 1 indicates a room or space to be conditioned having an inlet for conditioned air at 2 and an outlet at 3. Any suitable air conditioner may be provided, the one illustrated comprising a conditioner 4 having an intake 5 from the outside by means of which outdoor air may be introduced and also an intake 6 by means of which recirculated air may be introduced, both of these intakes being provided with dampers so as to regulate or entirely shut off the amount of air to be circulated through them. Both intakes deliver air into a mixing chamber 15.

A heating coil is positioned near the entrance end of said mixing chamber. Said coil 7 is supplied by means of a steam pipe 8, the amount of steam introduced being regulated by a hand valve 9. An automatic regulation of the steam may also be provided by a valve 10 controllable by thermostatic arrangements (not shown). Air introduced at 5 and 6 is passed through or by-passed under (by-pass means not shown) the first heating coil 7 into the spray chamber where water from spray and mist nozzles 11 is sprayed into the air, said water being ejected through the spray or mist nozzles by means of a pump 12.

Water is introduced into the conditioning apparatus through a constant level valve 13 into a trough-like tank at the bottom of the apparatus, from which it is pumped through a pipe 14 to the spray nozzles located both in the spray chamber and over the cooling surface part of the apparatus adjoining the spray chamber. The cooling surface part of the conditioner merely consists in flooding sprays feeding water to a series of heat exchanger pipes containing a refrigerant to cool the water and at the same time affords a further cooling of the air. From this the air is passed through water eliminators 16 which are merely baffle plates interposed in the stream of air to remove mechanically entrained water. The air is next passed through or by-passed around (by-pass means not shown) a heating coil 17 controlled by valves 9a and 10a in the same manner as coil 7. The air is then discharged into the feed duct by a motor driven fan 18.

From the feed duct 19, air is introduced into the conditioned space 1 through a diffuser mechanism. Interposed in the feed duct 19 may be an automatically controlled damper 20 controlled by any electrical or mechanical device such as a solenoid indicated at 21 which is operated or actuated by a thermostatic arrangement located in the room or conditioned space. In the path of the air flow after this damper there may be placed an automatic device as at 22 for the control of the motor driving the diffuser fan. This control device may be actuated by the draft of air flowing through the duct 19. Thus a mercoid switch such as shown in Figure 3 may be used which is pivoted freely and mounted on a freely swinging leaf or disc at right angles to the flow of air so that when air is being blown through the duct it will move the disc causing the mercury in the switch to flow to one end of the container and make contact thereby completing an electric circuit and automatically starting the motor of the diffuser. When the damper 20 is closed, the current of air is stopped; the mercoid thereupon assumes a level position, thereby breaking the electrical circuit and shutting off the motor driving the centrifugal blower of the diffuser. It is obvious that any other automatic motor and damper control may be used.

As best shown in Figure 2, a motor 30 drives a centrifugal type blower or fan 31 having air impelling fins. The motor 30 is mounted on a skeleton flange 32' at the outlet end of the air duct 19. The entire arrangement is preferably suspended from the ceiling of the conditioned space. A rigid sheet 32 suspended from the ceiling by brackets or straps 34 is positioned beneath the fan 31. Said sheet 32 is provided with an opening 33 in the center thereof to allow air from the conditioned space to be drawn into the centrifugal blower 31 and thrown outwardly thereby.

A stratum of room air radiates from the blower 31. Conditioned air under pressure in duct 19 strikes the solid plate forming the back part of the fan 31 and serving as an intermediate diffuser for the conditioned air. In striking the plate the direction of the conditioned air is changed and it will emanate laterally from the back surface of the fan at a somewhat lower velocity than the velocity of room air emanating from the fins of the fan wheel 31. The colder and therefore heavier conditioned air has a tendency to fall through the room air strata. In meeting the room air stream from the fan 31, the conditioned air will receive added energy in its lateral travel. By this process the conditioned air is spread over a great area before final diffusion with the air within the room.

It is also possible that the two streams of air admix somewhat while still behind the rigid plate 32. Such admixture would be colder and therefore heavier than room air and would tend to diffuse downwardly into the room after the lateral energy induced by the fans 18 and 31 is dissipated. The plate 32 is desirably extended beyond the opening of air duct 19 and also beyond the outer periphery of the blower 31. The brackets 34 are of minimum cross sectional area so as not to interfere with the flow of air from the air duct and from the blower. Likewise, the brackets 32' should preferably be of minimum cross section so as not to interfere with the passage of air through duct 19.

It is to be understood that while I have shown the diffusing mechanism to be mounted from the ceiling of the conditioned space, it may also be mounted on the walls or in any part of the conditioned space without departing from the scope of my invention.

Blower wheel 31 may be any of a type of solid back centrifugal blowers which draw air from the center and throw it out centrifugally from the periphery of the driven wheel.

Figure 3 represents an enlarged view of one type of automatic control that may be used at 22 to control the diffusion motor. 41 represents the ordinary type of mercoid switch containing terminals 42 and 43, and a container for the mercury 44 which is partially filled with mercury. When the switch is shifted or tipped at an angle, mercury will flow to the lower portion of the tube causing it to contact with the terminal 42, thereby completing an electrical circuit and permitting motor 30 to operate. The switch may be mounted in or on top of the air duct 19 and is tipped by the force of the air passing through that duct. A leaf or disc 45, is interposed directly, at right angles, to the flow of air in the duct 19 and is firmly connected to the mercoid switch 41, said switch being freely mounted on a pivot 46. Thus, air blown from the fan 18 in the feed duct passing through the open damper 20 will strike against the disc 45, thereby causing the switch 41 to be tipped and contact made with the terminal 42 to complete the electrical circuit to the motor. The diffusing apparatus is thus started up.

On the other hand, if temperature conditions in the conditioned space are such that no further conditioned air is needed in the room, the damper 20 is automatically closed by means of the solenoid or other automatic operation of the damper, thereby shutting off the flow of air in the duct 19 and causing the disc 45 to return to its normal perpendicular condition, which in turn causes the mercury in the mercoid switch to assume a level not contacting with terminal 42, thereby breaking the circuit and throwing the diffuser motor out of power and causing the diffusion blower to stop.

To briefly recapitulate the operation of my preferred system, air from the conditioned space 1 is passed through the duct 6 into the mixing chamber 15. Air from the outside or from other sources may be introduced through the intake 5 into the mixing chamber 15 at the same time. The air from the two inlets is then drawn through the spray and cooling surface chambers of the conditioner 4 where it is reduced to a predetermined dew point temperature. These two chambers operate by the introduction of water through valve 13 into a trough-like tank at the bottom of the chambers. This water is drawn through the pipe 14 into the pump 12 and forcibly emitted from the mist sprays in the spray chamber and the flood sprays in the cooling chamber. Water sprayed into the cooling chamber is trickled over cooling pipes and refrigerated.

The air is next drawn through fan 18 and blown through duct 19, finally striking the back of the fan 31 and emanating laterally into the room together with that portion of the room air which is drawn into the central intake on the opposite side of fan 31 and ejected laterally by the fan. After the lateral momentum of these two streams of air or of the partially mixed stream has been dissipated, a gradual diffusion of conditioned air throughout the room will occur.

The flow of air through the duct 19 may be controlled by the damper 20 actuated by the device 21 which is controlled by a thermostat arrangement in the room. The motor 30 propelling the fan 31 may be automatically controlled by a switch at 22 actuated by flow of air in the duct 19. The motor 30 may be entirely shut off when the system is not in use by means of a switch located in the room. When this switch is in positive position the entire apparatus operates automatically.

The dew point temperature desired to be maintained by the conditioner is determined from the room wet and dry bulb temperatures. The conditioner unit is operated to produce the desired dew point temperature by regulation of the dampers located in intakes 5 and 6, by control of the refrigeration of the water in the cooling surface part of the unit, by control of the heating coils located at the intake and discharge ends of the unit or by any combination of these controls. If desired the automatic steam regulating valves 10 and 10a may be operated by a thermostat located in the path of the discharged air.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In an apparatus for conditioning the air of a room, a conditioned air conduit entering the room near the top thereof, a motor driven fan positioned in spaced opposed relation to the mouth of said conduit and presenting a surface to deflect the flow of conditioned air, said fan having air impelling fins on the opposite side of said surface for drawing air directly from the room and blowing said air laterally into the room in a plane parallel to that of the deflected conditioned air.

2. In combination with a ventilating and air conditioning system, a conduit for conducting conditioned air to the room to be conditioned, a damper interposed in said conduit, a thermostatic device located in the room for automatically controlling said damper, a fan located at the mouth of said conduit and means interposed in said conduit between the mouth of the conduit and said damper for automatically controlling the operation of said fan, said means being actuated by the flow of air in the conduit as regulated by the damper.

3. In an apparatus for ventilating and conditioning a room, in combination, a conditioning apparatus, means for leading fresh air and air withdrawn from the room to said conditioning apparatus, a conduit for conducting air from the conditioning apparatus to the room, a damper located in said conduit controlled by a thermostatic device in the room, a motor propelled centrifugal fan located at the mouth of the conduit adapted to receive air from the room and eject it laterally into the room together with conditioned air, and an automatic switch located in the conduit between the mouth of the conduit and the damper and actuated by the flow of air in the conduit for controlling said fan.

4. In combination with a conditioned air conduit entering a space near the top thereof, a diffusion apparatus for creating a lateral stream of conditioned air above a stream of space air comprising a motor-propelled centrifugal fan in spaced opposed relation to the mouth of the conditioned air conduit, a plate having a central air intake opening below said fan, a solid back surface on said fan for deflecting the conditioned air in a lateral stream, and fins radiating from the central air intake on the opposite side of said surface for drawing air directly from the space and ejecting said air laterally along the plate in a stream below the deflected conditioned air.

HAROLD J. SPIELMANN.